(12) United States Patent
Herbrich et al.

(10) Patent No.: US 8,560,528 B2
(45) Date of Patent: Oct. 15, 2013

(54) DATA STRUCTURES FOR COLLABORATIVE FILTERING SYSTEMS

(75) Inventors: Ralf Herbrich, Cambridge (GB); Yoram Bachrach, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 12/725,862

(22) Filed: Mar. 17, 2010

(65) Prior Publication Data

US 2011/0231405 A1    Sep. 22, 2011

(51) Int. Cl.
G06F 7/00 (2006.01)
G06F 17/30 (2006.01)

(52) U.S. Cl.
USPC .......................... 707/722; 707/723; 707/732

(58) Field of Classification Search
USPC ......... 707/722, 732, 748, 749, 754, 758, 733, 707/734, 723; 715/811
See application file for complete search history.

(56) References Cited

U.S. PATENT DOCUMENTS

| | | | |
|---|---|---|---|
| 6,006,218 A | | 12/1999 | Breese et al. |
| 6,321,179 B1 | | 11/2001 | Glance et al. |
| 8,103,686 B2 | * | 1/2012 | Gollapudi et al. ............ 707/758 |
| 2006/0235810 A1 | | 10/2006 | Wen et al. |
| 2006/0282304 A1 | | 12/2006 | Bedard et al. |
| 2007/0106659 A1 | | 5/2007 | Lu et al. |
| 2007/0124698 A1 | * | 5/2007 | Majumder ................... 715/811 |
| 2009/0132520 A1 | | 5/2009 | Nemeth et al. |
| 2010/0088265 A1 | * | 4/2010 | Pohl .............................. 706/46 |

OTHER PUBLICATIONS

Achlioptas, "Database-friendly random projections: Johnson-Lindenstrauss with binary coins", retrieved on Jan. 22, 2009 at <<http://cs-people.bu.edu/evimaria/cs565/achlioptas.pdf>>, Academic Press, Inc., Orlando FL, Journal of Computer and System Sciences, vol. 66, No. 4, 2003, pp. 671-687.

Andoni, Indyk, "Near-Optimal Hashing Algorithms for Approximate Nearest Neighbor in High Dimensions", Communications of the ACM, vol. 51, No. 1, Jan. 2008, pp. 117-122.

Bachrach, Porat, Rosenschein, "Sketching Techniques for Collaborative Filtering", retrieved on Jan. 22, 2009 at <<http://ijcai.org/papers09/Papers/IJCAI09-332.pdf>>, Morgan Kaufmann Publishers, Joint Conference on Artificial Intelligence (IJCAI), 2009, pp. 2016-2021.

Bell, Koren, "Lessons from the Netflix Prize Challenge", ACM, SIGKDD Explorations Newsletter, vol. 9, No. 2, pp. 75-79.

(Continued)

*Primary Examiner* — Vincent F Boccio
(74) *Attorney, Agent, or Firm* — Zete Law, P.L.L.C.; MacLane C. Key

(57) ABSTRACT

Data structures for collaborative filtering systems are described. In an embodiment sketches which extremely concisely represent a list of items that a user has rated are created and stored for use by a collaborative filtering system to recommend items. For example, the sketches are created by using several versions of a cryptographic hash function to permute the item list and store a minimal value from each permutation in the sketch together with a user rating. In examples the sketches are used to compute estimates of similarity measures between pairs of users such as rank correlations including Spearman's Rho and Kendall's Tau. For example, the similarity measures are used by a collaborative filtering system to accurately and efficiently recommend items to users. For example the sketches are so concise that massive amounts of data can be taken into account in order to give high quality recommendations in a practical manner.

20 Claims, 14 Drawing Sheets

(56) References Cited

OTHER PUBLICATIONS

Breese, Heckerman, Kadie, "Empirical Analysis of Predictive Algorithms for Collaborative Filtering", Morgan Kaufmann Publishers, Conference on Uncertainty in Artificial Intelligence (UAI), 1998, pp. 43-52.

Broder, Charikar, Frieze, Mitzenmacher, "Min-Wise Independent Permutations", Journal of Computer and System Sciences, vol. 60, 2000, pp. 630-659.

Cormode, Datar, Indyk, Muthukrishnan, "Comparing Data Streams Using Hamming Norms (How to Zero In)", IEEE Computer Society, Transactions on Knowledge and Data Engineering, vol. 15, No. 3, May 2003, pp. 529-540.

Datar, Muthukrishnan, "Estimating Rarity and Similarity over Data Stream Windows", Springer-Verlag, London, European Symposium on Algorithms, Lecture Notes in Computer Science, vol. 2461, 2002, pp. 323-334.

Feigenbaum, Kannan, Strauss, Viswanathan, "An Approximate L1-Difference Algorithm for Massive Data Streams", Society for Industrial and Applied Mathematics, Philadelphia, SIAM Journal on Computing, vol. 32, No. 1, 2002, pp. 131-151.

Gionis, Indyk, Motwani, "Similarity Search in High Dimensions via Hashing", retrieved on Jan. 22, 2009 at <<http://www.cs.princeton.edu/courses/archive/spr06/cos592/bib/LSH-VLDB-gionis99.pdf>>, Morgan Kaufmann Publishers, Conference on Very Large Data Bases (VLDB), 1999, pp. 518-529.

Hoeffding, "Probability Inequalities for Sums of Bounded Random Variables", retrieved on Jan. 25, 2010 at <<http://www.jstor.org/pss/2282952>>, American Statistical Association, Journal of the American Statistical Association, vol. 58, No. 301, Mar. 1963, pp. 13-30.

Indyk, "A small approximately min-wise independent family of hash functions", retrieved on Jan. 22, 2009 at <<http://delivery.acm.org/10.1145/320000/314600/p454-indyk.pdf?key1=314600&key2=5945144621&coll=GUIDE&dl=GUIDE&CFID=74703597&CFTOKEN=47247099>>, Society for Industrial and Applied Mathematics, Philadelphia PA, Symposium on Discrete Algorithms, 1999, pp. 454-456.

Indyk, "A small approximately min-wise independent family of hash functions", Academic Press, Duluth, Journal of Algorithms, vol. 38, No. 1, Jan. 2001, pp. 84-90.

Kendall, "A New Measure of Rank Correlation", retrieved on Jan. 25, 2010 at <<http://www.jstor.org/pss/2332226>>, Biometrika Trust, vol. 30, No. 1-2, Jun. 1938, pp. 81-93.

Pessiot, Truong, Usunier, Amini, Gallinari, "Learning to Rank for Collaborative Filtering", retrieved on Jan. 22, 2009 at <<http://eprints.pascal-network.org/archive/00003696/01/iceis_2007.pdf>>, Conference on Enterprise System (ICEIS), Jun. 12, 2007, pp. 145-151.

Resnick, Iacovou, Suchak, Bergstrom, Riedl, "GroupLens: An Open Architecture for Collaborative Filtering of Netnews", retrieved on Jan. 22, 2009 at <<http://presnick.people.si.umich.edu/papers/cscw94/GroupLens.htm>>, ACM, Conference on Computer Supported Cooperative Work, 1994, pp. 175-186.

Rivest, "The MD5 Message-Digest Algorithm", RFC Editor, Apr. 1992, pp. 1-21.

Salakhutdinov, Hinton, "Semantic Hashing", retrieved on Jan. 22, 2009 at <<http://www.cs.toronto.edu/~rsalakhu/papers/semantic_final.pdf, ACM, Workshop on Information Retrieval and Applications of Graphical Models, 2007, pp. 1-8.

Shardanand, Maes, "Social Information Filtering: Algorithms for Automating 'Word of Mouth'", retrieved on Jan. 22, 2009 at <<http://www.abdn.ac.uk/~csc263/teaching/AIS/information/Shardanand.pdf>>, ACM, Conference on Human Factors in Computing Systems, 1995, pp. 210-217.

Wang, Robertson, de Vries, Reinders, "Probabilistic Relevance Ranking for Collaborative Filtering", retrieved on Jan. 22, 2009 at <<http://ict.ewi.tudelft.nl/pub/jun/JIR.pdf>>, Kluwer Academic Publishers, Hingham MA, Information Retrieval, vol. 11, No. 6, 2008, pp. 477-497.

Weiss, Torralba, Fergus, "Spectral Hashing", retrieved on Jan. 22, 2009 at <<http://people.csail.mit.edu/torralba/publications/spectralhashing.pdf>>, Advances in Neural Information Processing Systems (NIPS), 2008, pp. 1-8.

* cited by examiner

- $Ca=\{3,6,7,8\}$  $Cb = \{4,6,7,9\}$
- Perm:

| 1 | 2 | 3 | 4 | 5 | 6 | 7 | 8 | 9 | 10 |
  |---|---|---|---|---|---|---|---|---|---|
  | 8 | 7 | 4 | 2 | 6 | 1 | 10 | 3 | 9 | 5 |

- $Ca'=\{4,1,10,3\}$  $Cb'=\{2,1,10,9\}$
- $Sa=1$  $Sb=1$
- Sketch collision

FIG. 6

- Ca={3,6,7,8} Cb = {4,6,7,9}
- Perm:

| 1 | 2 | 3 | 4 | 5 | 6 | 7 | 8 | 9 | 10 |
|---|---|---|---|---|---|---|---|---|----|
| 3 | 5 | 9 | 2 | 1 | 6 | 10 | 8 | 4 | 7 |

- Ca'={9,6,10,8} Cb'={2,6,10,4}
- Sa=6 Sb=2
- No collision

FIG. 7

| Sketch for ..... user A | 3(3*) | 5(3*) | 6(1*) | 2(3*) | 9(1*) |
|---|---|---|---|---|---|
| | Collision | No collision | Collision | Collision | Collision |
| Sketch for ..... user B | 3(1*) | 8(2*) | 6(5*) | 2(4*) | 9(1*) |

800 (top row), 802 (bottom row)

DATA STRUCTURES FOR COLLABORATIVE FILTERING SYSTEMS

BACKGROUND

Recommender systems attempt to highlight items that a target user is likely to find interesting. For example, to recommend books to users of an online book store or to recommend users to other users. The items may be for example, goods, services, or users. Recommender systems may be used in a wide range of domains and a non-exhaustive list of examples is books, music, videos, images, web pages and news.

Many recommender systems use collaborative filtering which makes predictions about the tastes of a user (filtering) through collaboration among multiple users. Collaborative filtering systems predict whether a certain item is likely to interest a target user under the assumption that users whose past tastes are similar to the target user are likely to give a good prediction regarding the future tastes of the target user. For example, collaborative filtering systems may operate in two steps. First, they may seek users who share similar rating patterns with a target user. Second, they may use the ratings from those like-minded users found in the first step to generate a prediction for the target user.

It is difficult to build real-world collaborative filtering systems as these need to handle huge volumes of information in real time. For example, the universe of items is often enormous and there are many users. This has meant that many recommender systems have produced low quality recommendations because they are only able to use relatively small amounts of data. Recommender systems that operate by aggregating and correlating the opinions of many individuals show their true strength when using massive amounts of data. However, storing and processing such massive data sets is usually not tractable. Furthermore, in many cases the full data sets do not fit in memory, and thus have to be stored on secondary storage such as disks and tapes so that the processing is extremely slow.

The embodiments described below are not limited to implementations which solve any or all of the disadvantages of known collaborative filtering systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Data structures for collaborative filtering systems are described. In an embodiment sketches which extremely concisely represent a list of items that a user has rated are created and stored for use by a collaborative filtering system to recommend items. For example, the sketches are created by using several versions of a cryptographic hash function to permute the item list and store a minimal value from each permutation in the sketch together with a user rating. In examples the sketches are used to compute estimates of similarity measures between pairs of users such as rank correlations including Spearman's Rho and Kendall's Tau. For example, the similarity measures are used by a collaborative filtering system to accurately and efficiently recommend items to users. For example the sketches are so concise that massive amounts of data can be taken into account in order to give high quality recommendations in a practical manner.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 6 is a schematic diagram of identifying sketch collisions;

FIG. 7 is a schematic diagram of identifying the absence of a sketch collision;

FIG. 8 is a schematic diagram of two user sketches;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a collaborative filtering system, the system described is provided as an example and not a limitation. As those skilled in the art will appreciate, the present examples are suitable for application in a variety of different types of recommender systems.

Figure 1:
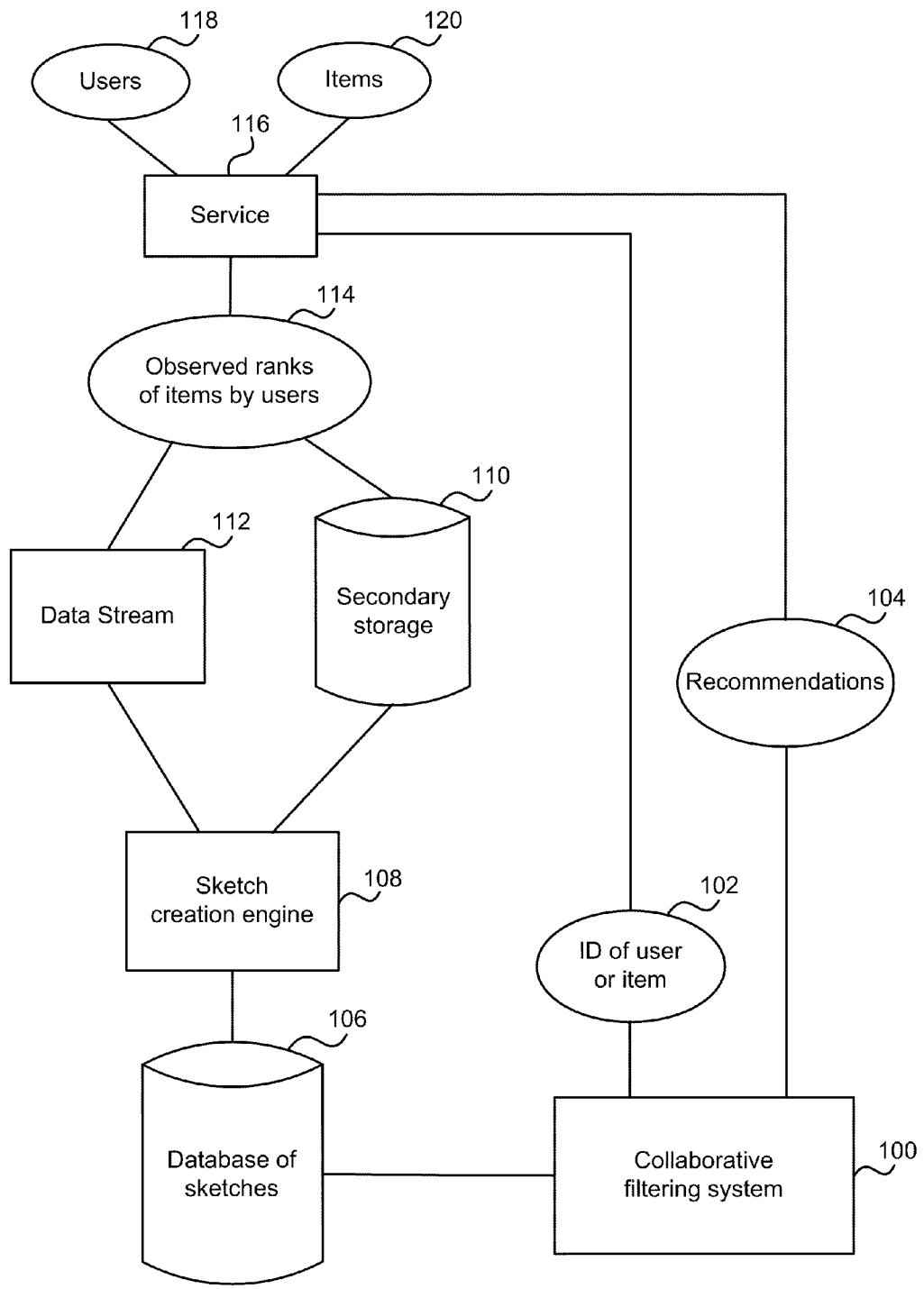
FIG. 1 is a schematic diagram of a collaborative filtering system used by a service and also showing a sketch creation engine.

FIG. 1 is a schematic diagram of a collaborative filtering system 100 used by a service 116 and also showing a sketch creation engine 108. The service 116 may be any service whereby users 118 rate items 120. The users may be human users or automated users. A non-exhaustive list of examples of items is: books, music files, videos, images, web pages, emails, documents, other users, news reports, films, SMS messages, programming languages, algorithms, social network postings, social network status update, blogs, news items, chat items from a chat service. The users may rate (or rank) the items either explicitly or implicitly. For example, an explicit rating may be a score out of 5 that a user gives to a film after having viewed that film. An implicit rating may be an observation that a user did not click an item in a web search result list or another observation of user behavior. The service may be provided on the internet or in any manner such that user ratings may be observed and such that unique user references or identifiers 102 may be provided to the collaborative filtering system 100. The service 116 is also arranged to receive recommendations 104 from the collaborative filtering system 100.

As mentioned above, the service 116 provides observed ranks 114 (or ratings) of items 120 by users 118. These observations may form a data stream 112 which issues from the service 116. It is also possible for the observations to be stored at secondary storage 110 or other suitable storage.

A sketch creation engine 108 which is computer implemented is provided. This engine 108 may be integral with the collaborative filtering system 100 or may be independent as illustrated in FIG. 1. The sketch creation engine takes input comprising the observed ranks or ratings of items by users 114 and forms a database of sketches 106. This database may be formed offline and/or may be updated incrementally as the service operates and observations 114 are made. The database of sketches 106 may be stored in RAM at the collaborative filtering system 100 depending on the application domain concerned giving benefits of improved access time. However, this is not essential, the database of sketches 106 may be stored using any suitable storage means.

Each sketch is a data structure in memory which stores an extremely concise representation of the items a user has rated. These data structures are carefully and particularly constructed so as to provide a representation which is well suited to the task of providing high quality accurate recommendations in real time using a collaborative filtering system 100. The sketches may be much shorter than compression techniques allow. Using the particular form of sketches described herein it is found that very small sketch sizes are sufficient to achieve high levels of accuracy. In this way, rather than storing, transmitting and processing an entire list of rated items produced by a service 116, the collaborative filtering system 100 is able to operate on the extremely concise sketches.

The collaborative filtering system 100 is arranged to receive an identifier of a target user 102 and to produce recommendations 104 comprising one or more items to be recommended to that target user. The collaborative filtering system 100 may also receive an identifier of a target item and produce recommendations 104 comprising other items 120 which are found to be similar to the target item. The collaborative filtering system has access to the database of sketches 106 or is integral with that database.

Figure 2:
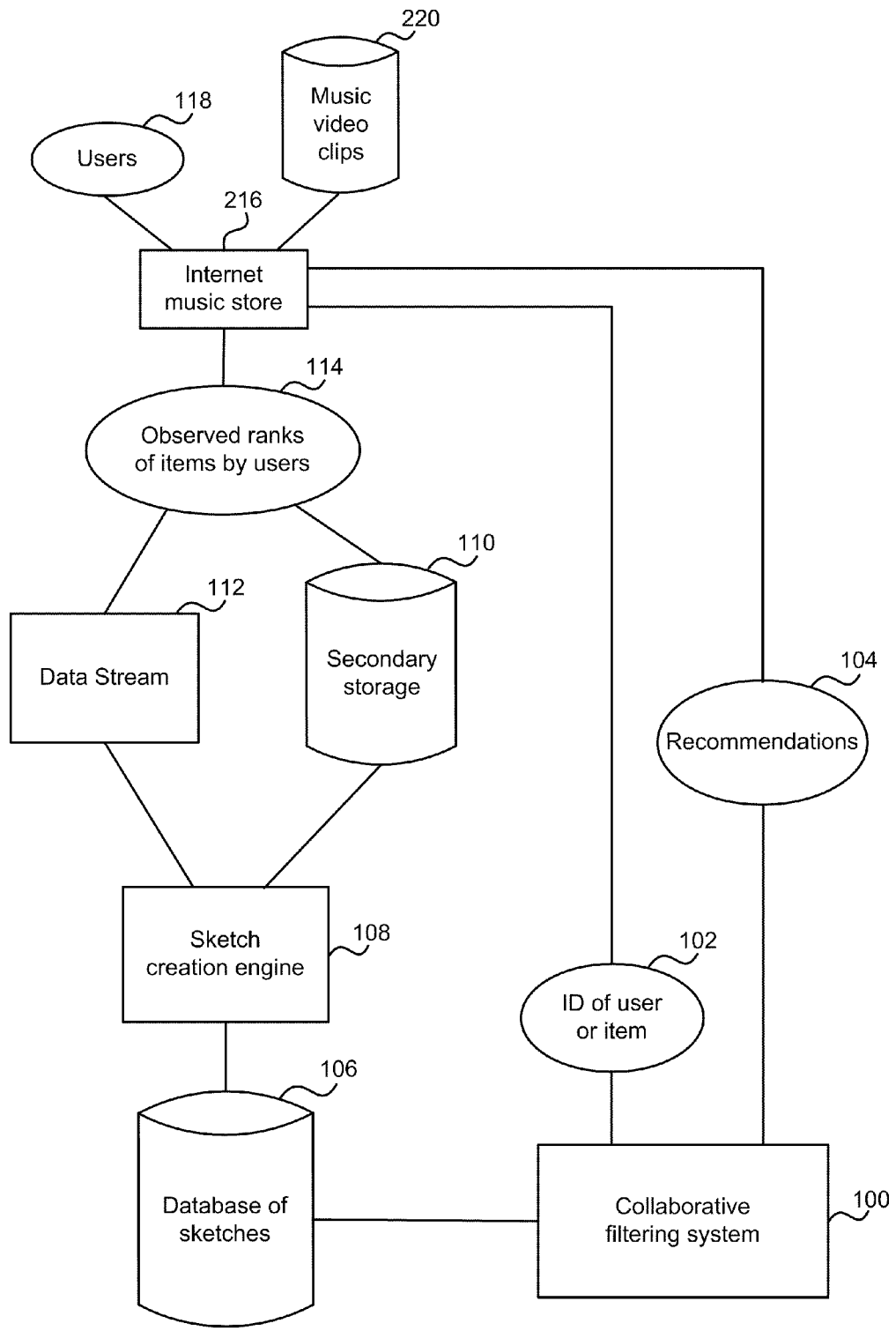
FIG. 2 is a schematic diagram of an internet music store having a collaborative filtering system.

FIG. 2 is a schematic diagram of an example where the service is an internet music store 216 and the items are music video clips 220. Suppose the internet music store 216 holds over 100 million music video clips 220. To represent each integer in that range 27 bits are used. The observed ranks 114 may be obtained from user input or inferred by using the number of times a user has watched a clip or the amount of time spent watching it. Suppose each user has watched 10,000 clips. Using the embodiments described herein the sketch size may be less than 337. Thus a list of a user's clips requires 27*10,000=270,000 bits whereas a sketch only requires 337*27=9099 bits or fewer. Since there may be millions of users 118 this is a significant improvement.

Figure 3:
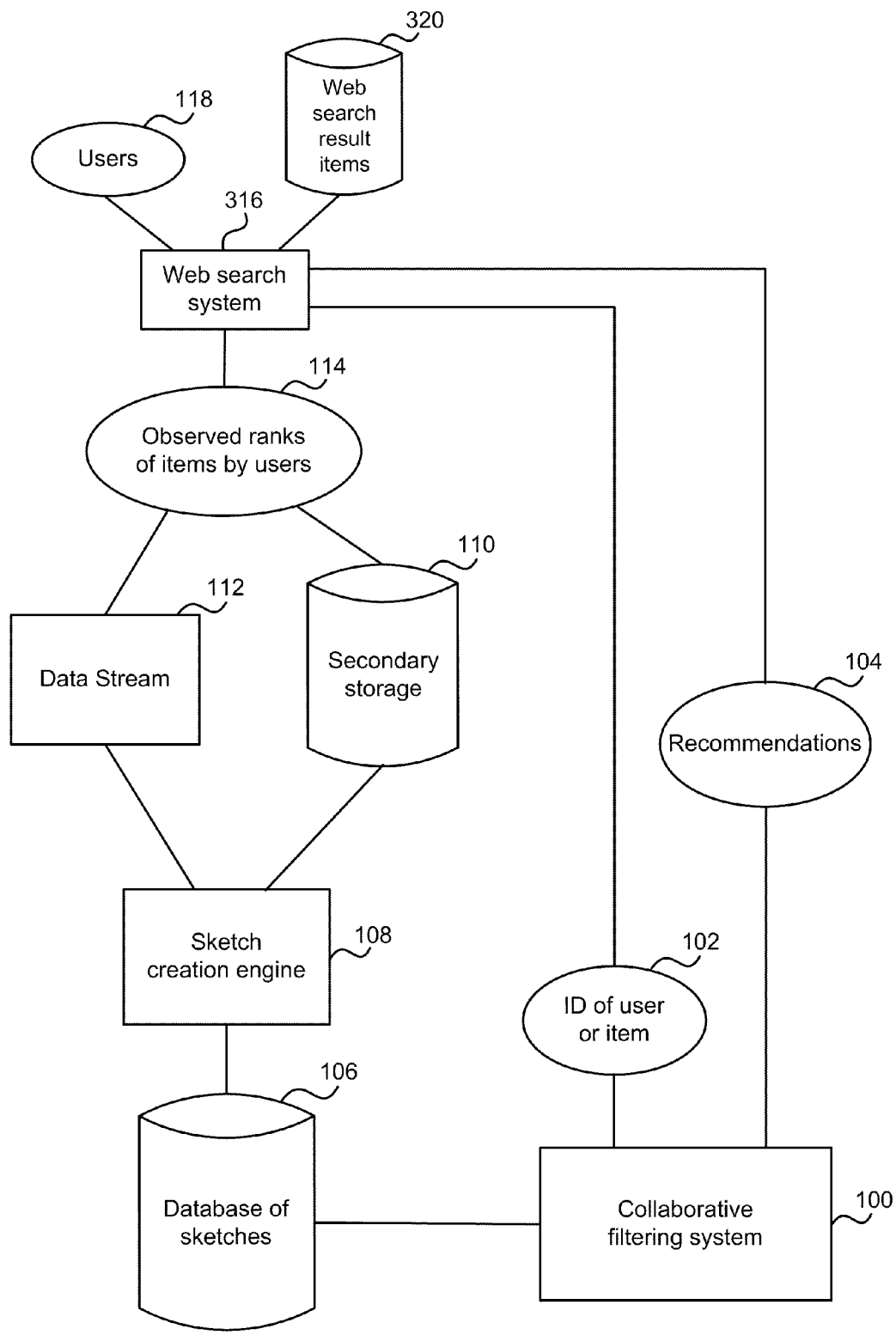
FIG. 3 is a schematic diagram of a web search system having a collaborative filtering system.

FIG. 3 is a schematic diagram of an example where the service is a web search system 316 and the items are web search result items 320. In this case the collaborative filtering system 100 may provide recommendations that suggest to users websites that were frequently visited by similar users. In this case, the number of items may be 30,000 million so that each item requires 35 bits to represent. Assuming that the observations comprise a list of 10,000 pages ranked per users, a list representation would require 350,000 bits per user. However, using the embodiments described herein the sketch size may remain at 9099 bits or lower giving a massive saving.

Figure 4:
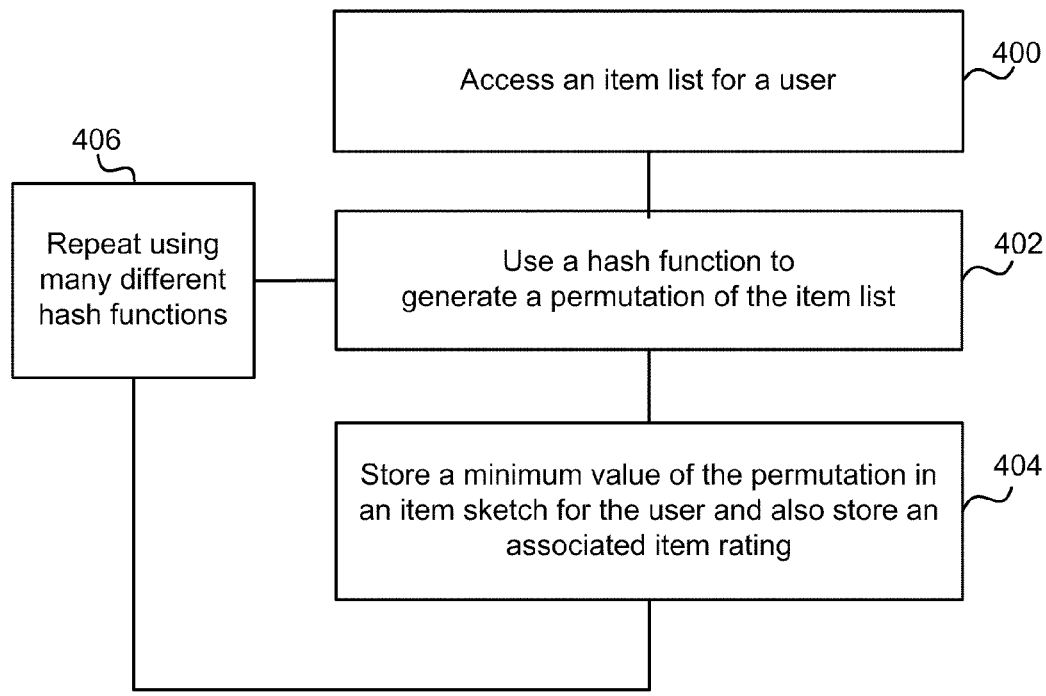
FIG. 4 is a flow diagram of a method at a sketch creation engine.

FIG. 4 is a flow diagram of a method at the sketch creation engine 108 for creating a sketch. A sketch is to be created for a specified user and the sketch creation engine accesses 400 an item list for that user. The item list may be obtained from the data stream 112 and/or secondary storage 110 of FIG. 1. The item list is a list of items that have been rated by the user. For example, the item list may be a list of the 10,000 items most recently rated by the user. The sketch creation engine selects a hash function and applies it to the item list to generate 402 a permutation of the item list. Any suitable cryptographically secure hash function (whether vulnerable or not) may be used and a non-exhaustive list of examples is: the MD5 message-digest algorithm which is described in the IETF request for comments 1321; min-wise independent families of hashes; GOST; NAVAL; MD2; MD4; PANAMA; RadioGatun; RIPEMD; RIPEMD128/256; RIPEMD-160/320; SHA-0; SHA-1; SHA-256, 224; SHA-512/384; Tiger (2)-192/160/128; WHIRLPOOL. For a given type of hash function, the process of selecting a hash function comprises substantially randomly selecting a particular instance of a hash function of that type. For example, the hash function may be randomly selected from a min-wise independent family of hash functions. In another example, the type of hash function may be MD5 hash. In this case, many different versions of the MD5 hash are computed and the sketch creation engine is able to randomly select a particular hash function from those pre-computed versions. For example HMAC-MD5 versions may be computed using a hash function in combination with a key, where different keys result in different hash functions, all of which appear to have a random behavior.

The minimum value from the permutation of the item list is found and stored 404 in a data structure together with an item rating for the associated item. Another instance of the type of hash function being used is then selected and the process repeated 406. The process of selecting a hash function, generating a permutation of the item list and storing the values in the data structure are repeated many times to produce the sketch. The sketch size affects the quality of the final recommendations. However, as explained in more detail a process for selecting the sketch size is provided and also it is found that even quite small sketches result in high quality recommendations.

Figure 5:
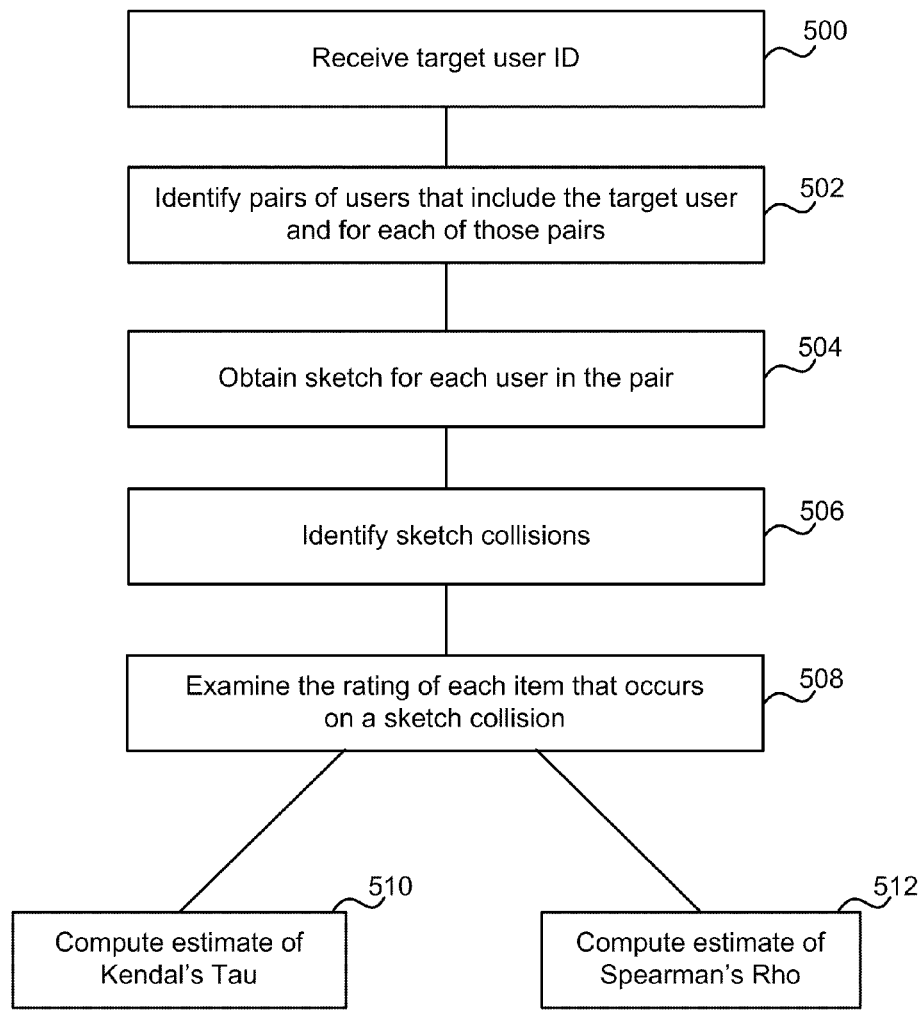
FIG. 5 is a flow diagram of a method at a collaborative filtering system of computing an estimate of the similarity of two user's tastes.

FIG. 5 is a flow diagram of a method at the collaborative filtering system 100 of computing an estimate of the similarity of two user's tastes. The estimate of the similarity may be an estimate of a rank correlation co-efficient. A non-exhaustive list of examples of such rank correlation co-efficients is: Kendall's Tau, Spearman's Rho, Pearson's product moment co-efficient.

Rank correlations, such as Spearman's Rho and Kendall's Tau, measure the similarity between two rankings (orderings) of the same items. Spearman's Rho is a case of the Pearson product-moment coefficient, in which the data sets are converted to rankings before calculating the coefficient. Let $x_i=r_a(i)$ and $y_i=r_b(i)$ be the rankings of items I, given by Alice and Bob, and let $d_i=x_i-y_i$. Spearman's Rho $\rho_{r_a,r_b}$ can be computed using the following direct formula:

$$\rho_{r_a,r_b} = 1 - \frac{6\sum_{i=0}^{n} d_i^2}{n(n^2-1)}.$$

Both Kendall's Tau and Spearman's Rho range from −1 (strong negative correlation) to 1 (strong positive correlation).

The collaborative filtering system receives 500 a target user ID which identifies a user for which recommendations are to be generated. For example, the target user ID is provided by the service 116 of FIG. 1 or in any other suitable manner. The collaborative filtering system has access to a sketch database 106 comprising a sketch for each user. The collaborative filtering system identifies 502 all pairs of users which include the target user and for each of those pairs it computes an estimate of the similarity of the two users in that pair. To do this it obtains 504 the sketch for each user in the pair and identifies 506 any sketch collisions occurring between those two sketches. Sketch collisions are explained in more detail below with reference to FIGS. 6 and 7. For each item that occurs on a sketch collision the collaborative filtering system 100 examines 508 the associated rating. Using this collision and rating information the collaborative filtering system is able to compute 510 an estimate of Kendall's Tau and/or an estimate 512 of Spearman's Rho as explained in more detail below. To compute an estimate of Spearman's Rho the rankings of each item that occurs on a sketch collisions are taken. These are used to compute Spearman's Rho random variables (one for each sketch collision) which are then combined, for example by summation, to provide an estimate of Spearman's Rho.

Using the rank correlations the collaborative filtering system 100 is able to provide recommendations. For example, the collaborative filtering system 100 may predict the rating a target user would give to an unexamined item, based on the ratings given to that item by other users, weighted according to the similarity measure to the target user.

FIG. 6 is a schematic diagram of identifying sketch collisions. In this example the items are films for example. An item list for user a is shown as Ca={3,6,7,8} indicating that user a has viewed films having those identifiers. An item list for user b is shown as Cb={4,6,7,9}. The users have given ratings to each film they have viewed and for example, these ratings are from 1* to 5* with 5* being the best rating. In an example these ratings are as follows with each rating being given in the item list immediately subsequent to the associated film ID. Ca={3 (5*),6 (1*),7(3*),8(2*)}Cb={4(1*),6(5*),7(2*), 9(2*)}. A hash function is applied to the item lists to produce Ca' and Cb'. For example, the hash function performs a mapping of the integers 1 to 10 (shown in the top row of the table in FIG. 6) to a permutation of those integers (shown in the bottom row of the table in FIG. 6). In this example the first entry in the item list for user a is film ID 3 which maps to 4. The second entry in the item list for user a is film ID 6 which maps to 1. In this manner Ca' is produced where Ca'={4, 1, 10, 3} and Cb'={2,1,10.9}. The ratings are unaffected by the hash function so that the permuted item lists with ratings are Ca'={4(5*), 1(1*), 10(3*), 3(2*)}.

The minimum item from the permuted item list is taken. For Ca' this is 1 and for Cb' this is also 1. The associated ratings may also be shown as follows Ca' 1(1*) and Cb' 1(5*). The minimum items and associated ratings are stored in respective sketches for the two users. For example, user a has sketch Sa comprising 1(1*) and user b has sketch Sb comprising 1(5*). This is an example of a sketch collision because the corresponding entries in the sketches are of the same value which in this case is 1. As described with reference to FIG. 4 the process repeats for different hash function instances and the sketches grow accordingly. The sketch creation engine and/or collaborative filtering system may keep a running tally of the number of sketch collisions.

FIG. 7 is a schematic diagram of a situation where no sketch collision occurs. The item lists for users a and b are the same as in FIG. 6 however the hash function is different. The results of the permutation Ca' and Cb' are then Ca'={9,6,10,8} and Cb'={2,6,10,4}. The minimum value for Ca' is 6 and for Cb' 2 and these values are not the same. Therefore no sketch collision occurs.

FIG. 8 is a schematic diagram of two user sketches 800, 802 and illustrates how pairs of sketch collisions may be identified and assessed as to whether they are in agreement or not. The first item in the user sketch for user A is 3(3*) and for user B is 3(1*). This is a collision because the item values are the same (both 3 in this case). The next collision between the sketches occurs at the third sketch entry as indicated where the entry for sketch A is 6(1*) and for sketch B is 6(5*). This pair of sketch collisions exhibits a disagreement because the two users like different films (user a likes film 3 best and user b likes film 6 best). Of the items in the sketch collision, the ratings are examined to find the film each user likes best. For user a the choice is between film 3 rated 3* and film 6 rated 1*. For user b the choice is between film 3 rated 1* and film 6 rated 5*.

Another pair of sketch collisions is then identified. For example, in FIG. 8 this occurs for the fourth and fifth items in the sketches. Of the items in the sketch collision the highest rated film for user a is film 2 and for user b film 2. This is an example of a sketch collision agreement because the same item is most highly rated by each user.

The process of identifying pairs of sketch collisions and finding whether these are agreements or disagreements is repeated many times and a running total of the number of agreements in proportion to the total number of collisions kept.

Figure 9:
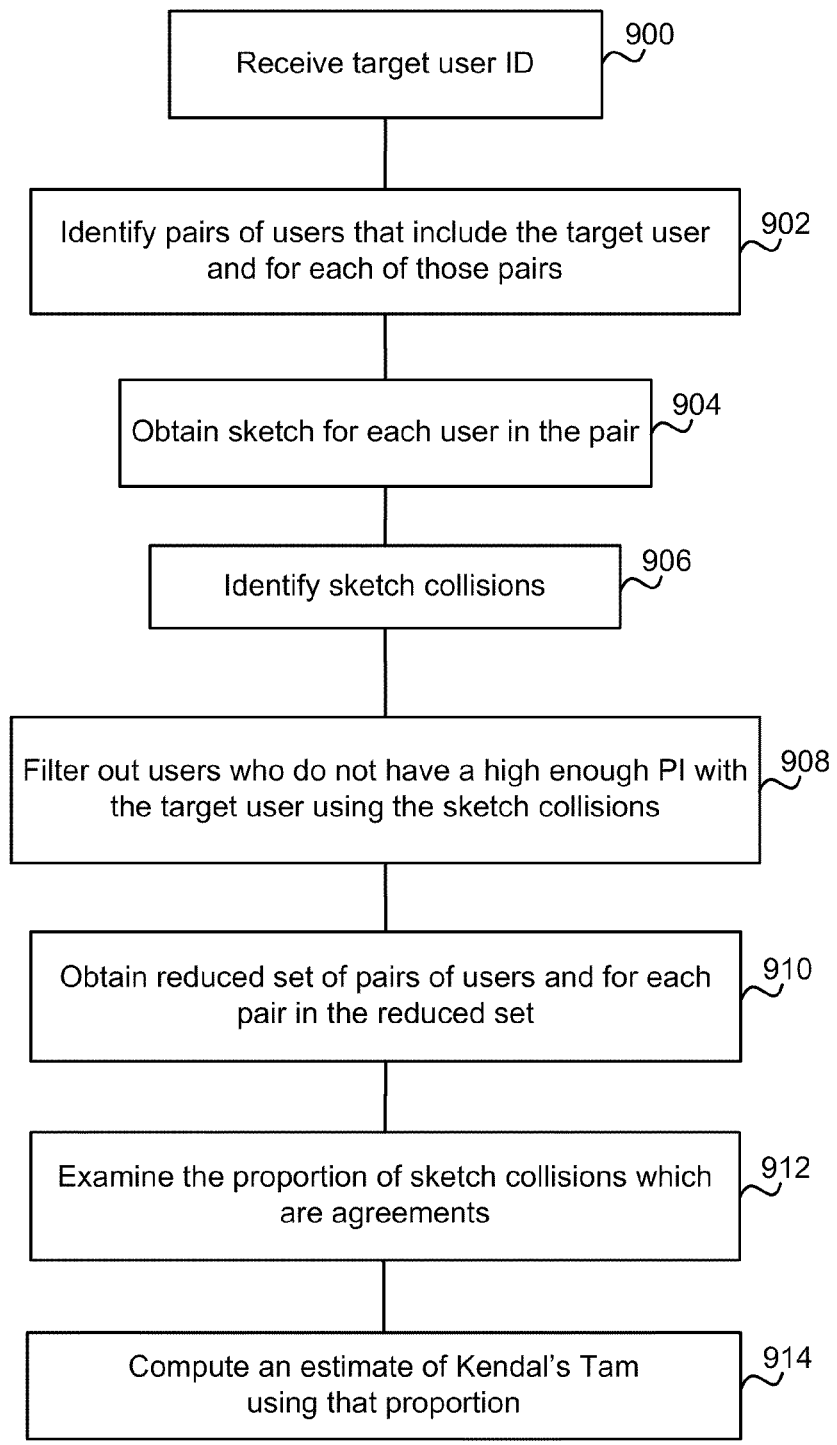
FIG. 9 is a flow diagram of a method of computing an estimate of Kendall's Tau.

FIG. 9 is a flow diagram of an example method of computing an estimate of Kendall's Tau. This may be implemented at the sketch creation engine and/or the collaborative filtering system 100. As in the method of FIG. 5 a target user ID is received 900. Pairs of users which include the target user are identified 902 and for each of those pairs an estimate of Kendall's tau is computed as now described.

For each user in the pair the sketch for that user is obtained 904 from the sketch database. Sketch collisions between the sketches of the pair are identified 906 and these sketch collisions are used to filter out some of the users (those whose rating pattern is dissimilar to that of the target user). For example, users who do not have a high enough proportional intersection with the target user may be filtered out. In another example, users who do not have a high enough Jackard measure with the target user are filtered out. Given two users, Alice and Bob, who examined the same number of items, their proportional intersection is defined as follows: Denote as $C_i$ the set of items Alice examined, and by $C_j$ the set of items Bob examined. Both users examined the same number of items so $|C_i|=|C_j|$. The proportional intersection (PI) is $$\frac{|C_i \cap C_j|}{|C_i|} = \frac{|C_i \cap C_j|}{|C_j|}.$$

The Jackard measure is when $|C_i| \neq |C_j|$ and is defined as $$J_{i,j} = \frac{|C_i \cap C_j|}{|C_i \cup C_j|}.$$

The filtering process is optional and provides a reduced set 910 of pairs of users. For each of those pairs in the reduced set an estimate of Kendall's Tau (or another rank correlation) may be computed. The proportion of sketch collisions between the sketches of the pair which are agreements 912 is found. An agreement occurs where the highest ranked item of the sketch collision is the same for each user of the pair. Using the proportion of sketch collisions which are agreements an estimate 914 of Kendall's Tau may be obtained.

Figure 10:
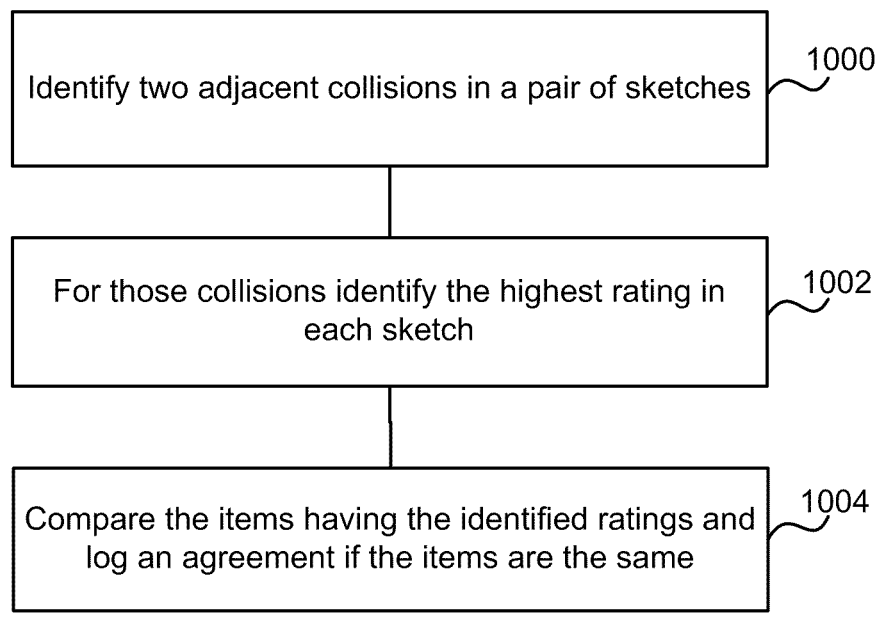
FIG. 10 is a flow diagram of a method of identifying sketch collisions that exhibit an agreement.

FIG. 10 is a flow diagram of identifying a sketch collision which exhibits an agreement. Two adjacent collisions are identified 1000 in a pair of sketches. For those collisions the algorithm proceeds to identify 1002 the highest rating in each sketch. The items having the identified ratings are compared and an agreement is logged 1004 if the items are the same.

Another detailed example is now given. Let $i$; $j$ be two users, and $C_i$; $C_j$ the set of items each has examined. A hash function is randomly chosen from a min-wise independent family, H. Consider the identities of items in the set $C_i$ of items examined by each user as integers, apply h to all these integers and examine the minimal value obtained. Given a randomly chosen $h \in H$ denote a minimal value obtained after applying h to all elements in $C_i$ as $m_i^h = \min_{x \in C_i} h(x)$. Performing the same on $C_j$ denote $m_j^h = \min_{x \in C_j} h(x)$. Now examine the probability that $m_i^h = m_j^h$. When $|C_i| = |C_j|$ so the PI is $$p_{i,j} = \frac{C_i \cap C_j}{|C_i|} = \frac{C_i \cap C_j}{|C_j|},$$

giving $$Pr_{h \in H}[m_i^h = m_j^h] = \frac{p_{i,j}}{2 - p_{i,j}}.$$

For the Jackard measure, $$J_{i,j} = \frac{|C_i \cap C_j|}{|C_i \cup C_j|}.$$

In an example the sketches are created using k hash functions. Let $v_k = (h_1, h_2, \ldots, h_k)$ be a tuple of k randomly chosen functions from the min-wise independent family, H, and let $C_i$ be the set of items that user i has examined. Denote the minimal item in $C_i$ under $h_s$ as $m_i^{h_s} = \min_{x \in C_i} h_s(x)$. For example, the $H_k$ sketch (referred to as an item sketch) of $C_i$, $S(C_i)$, is the list of minimal items in $C_i$ under the k randomly chosen functions from $h: S^k(C_i) = (m_i^{h_1}, m_i^{h_2}, \ldots, m_i^{h_k})$.

In examples a hash $h_s$ where $m_i^{h_s} = m_j^{h_s}$ is referred to as a collision hash, and location s is referred to as a sketch collision for i; j. In order to approximate the PI $p_{a,b}$ with accuracy $\epsilon$ and confidence $\delta$, it is enough to use $$k = \frac{\ln \frac{2}{\delta}}{2 \frac{\delta^2}{9}} \text{ hashes.}$$

As explained with reference to FIG. 9 box 908 the collaborative filtering system may be arranged to filter out any user with a Jackard score (or PI score) lower than some value p*, and augment the sketches to compute rank correlations. The collaborative filtering system may then recommend items based on scores that weight rankings given by users according to their similarity with the target user. A strong user similarity metric is rank correlation.

For example the sketches are augmented with the rating of the minimal item under the hash. Consider Alice and Bob, with Jackard similarity of at least p*. The sketch creation process may use k random hashes, and the resulting sketch is the list of the minimal items under each hash. Given users i with items $C_i$ and j with items $C_j$, the probability of a collision for i; j on any location s depends on $J_{i,j}$. If $J_{i,j} \geq p^*$, any location has a probability of at least p* of being a collision. A collision in location s is $h_s(q)$, where q is an identity of an item chosen uniformly at random from $C_i \cap C_j$ (an item both i and j examined).

The sketches may include the rating of the item q. Each location in a sketch is built using a randomly chosen hash. Let $h_i$ be the hash used in the i'th location. The augmentation for that location contains the rating of the item that is minimal under h. When constructing the sketch for user a, the sketch creation engine considers the user's item set $C_a$ and the ratings of the items in $C_a$. The rating of user a for items in $C_a$ is denoted as $r_a$. Thus, $r_a$ maps items in $C_a$ to their rating.

The sketch for user a in the i'th location contains the minimal item in $C_a$ under $h_i$, and its rating in a's eyes. The sketch for user a with items $C_a$ is denoted as $S^k(C_a)$.

In examples where the sketches include rating information the sketches may be referred to as rank correlation sketches. The $H_k$ rank correlation sketch of $C_a$, $S^k(C_a)$, may comprise both the item sketch and the rank sketch. The item sketch is the list of minimal items in $C_a$ under the k randomly chosen hash functions, so $S_{items}^k(C_a) = (m_a^{h_1}, m_a^{h_2}, \ldots, m_a^{h_k})$, and the rank sketch may comprise the ranks of these items. The rank correlation sketch may be the concatenation (or other suitable combination) of these two sketches.

The sketch size for approximating Kendall's Tau using RC sketches for users with PI of at least p*, where $$p = \frac{p^*}{2 - p^*},$$

is operable with a sketch size of $$m \geq \frac{k}{p} + \frac{\ln \frac{1}{\delta_c}}{4p^2}(1 + 3\sqrt{k}),$$

where $$k = 2k_t = \frac{4\ln\frac{2}{\delta_t}}{\hat{\delta}_t^2}$$

and $\hat{\delta}_t$ is the specified accuracy and $\delta_t$ is the specified confidence.

The sketch size for approximating Spearman's Rho may be selected using the following criteria. Observe that a rank correlation sketch collision for two users provides the ratings of each of the two users of a randomly chosen item from $C_a \cap C_b$. Thus, a collision provides $r_a(x), r_b(x)$ for a randomly chosen item $x \in C_a \cap C_b$.

It is possible to determine how many collisions are present to approximate Spearman's Rho with a specified target accuracy and confidence.

In an example it is desired to return an approximation to Spearman's Rho $\rho_{a,b}$ such that with probability of at least $1-\delta$ the following condition is met $|\rho_{r_i,r_j} - \rho_{i,j}| \leq -\hat{\delta}$. The number of hashes to provide at least k collisions may be determined as follows.

Let k be a certain number of sketch collisions, and let p be a bound from below on the Jackard similarity of any two users. A sketch size to achieve the number k of sketch collisions with probability $$1 - \delta_c \text{ is } m \geq \frac{k}{p} + \frac{\ln\frac{1}{\delta_c}}{4p^2}(1 + 3\sqrt{k}).$$

The sketch collision probability depends on the Jackard similarity. Given a minimal Jackard similarity, a long enough sketch would provide the number of collisions with high probability. The sketch length is logarithmic in the confidence $\delta_c$ and polynomial in the number of collisions.

A family of rank correlations, including Spearman's Rho, may be computed using rank correlation sketches. Members of this family may be expressed as a bounded function of the rank differences, summed across all items.

Using sketches with a length determined as described above a high probability of getting a large enough number of sketch collisions is achieved. Each such sketch collision gives the rating $r_a(x), r_b(x)$ of a certain randomly chosen item x, that both users (a and b) ranked. To compute an estimate for Spearman's Rho, the collaborative filtering system takes the rankings $r_a(x), r_b(x)$ of each item x that occurs on a sketch collision, and uses them to compute $$X_i = 1 - \frac{6(r_a(x) - r_b(x))^2}{n^2 - 1},$$

the random variables being defined above. Given c sketch collisions, use $$\frac{1}{c}\sum_{i=1}^{c} X_i$$

as an estimate for rho.

This type of method can be used for many similar rank correlation functions. For example, let a be a constant and the function f be bounded between certain constant values $b_l$ and $b_h$. The sketch based methods described herein can be used to compute any rank correlation of the form:

$$\alpha = a + \frac{1}{n}\sum_i f(r_a(i), r_b(i)).$$

Empirical analysis of a collaborative filtering system using the algorithms described herein has been carried out for a movie ratings dataset. That dataset contains 100 million anonymous movie ratings given by half a million users on a collection of 17,000 movies.

Figure 11:
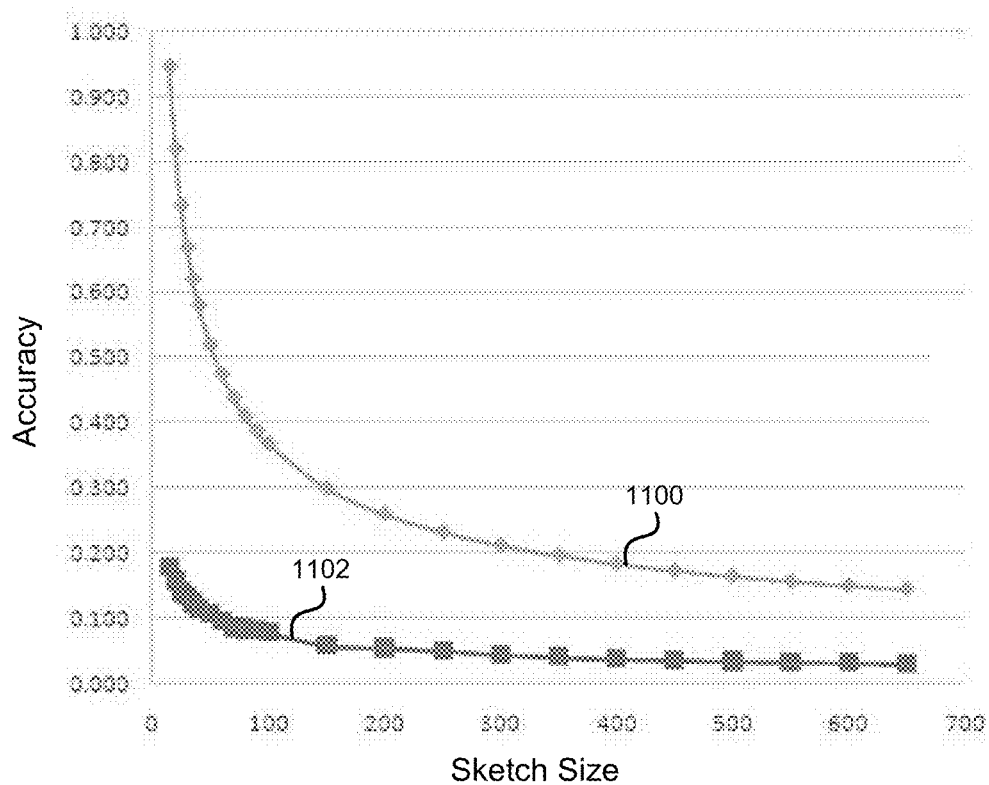
FIG. 11 is a graph of theoretical and empirical accuracy results of a collaborative filtering system.

Pairs of movies were randomly chosen. For each pair the similarity was computed using the full data set, and through sketches. FIG. 11 shows the empirical accuracy (measured in the experiment sequence) and the theoretical accuracy (obtained from the theoretical formulas) for a confidence level of 0.9. Lower accuracy numbers are better as the accuracy is the maximal allowed error. FIG. 11 shows that on the movie dataset the actual accuracy is much better than the theoretical bounds predict.

Figure 12:
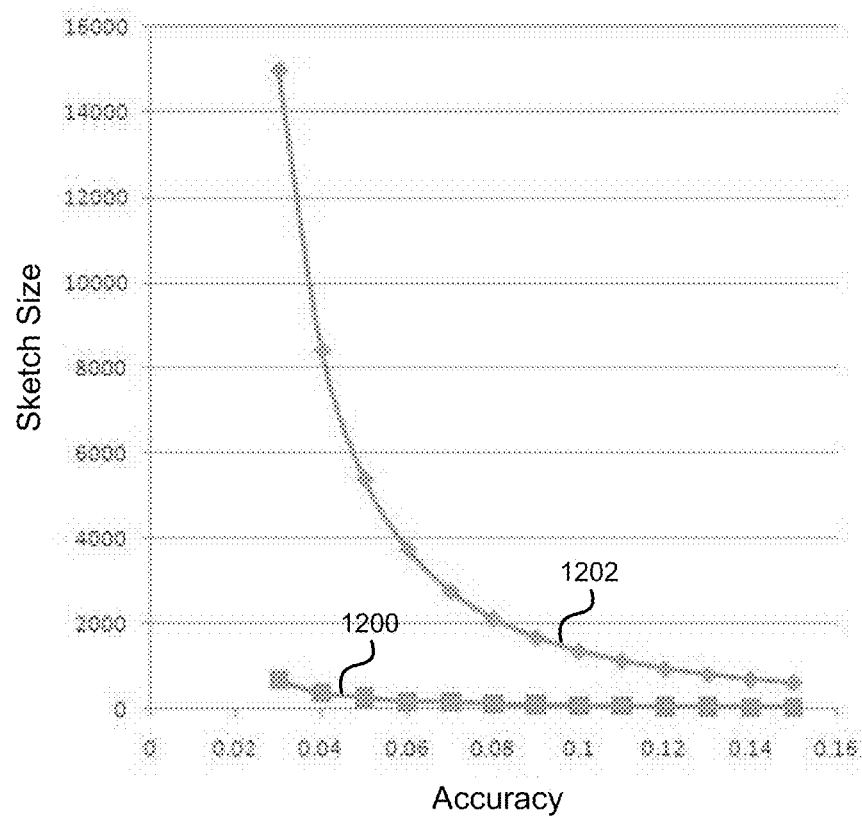
FIG. 12 is a graph of theoretical and empirical sketch size results of a collaborative filtering system.

FIG. 12 is a graph of sketch size against garget accuracy for confidence 0.9. FIG. 12 shows that the sketch size in empirical tests is much smaller than the theoretical bounds. FIG. 12 shows that the empirical sketch size is roughly proportional to the theoretical bounds. The empirical size is about only 5% of the theoretical size. This indicates that in practice it is not necessary to use large sizes for the sketches to achieve good accuracy. The sketch size may be selected for a particular application domain by using a dataset sample an analyzing that to find an appropriate sketch size The quality of recommendations, based on sketches of different lengths, were tested empirically. The collaborative filtering system implemented a recommendation algorithm where the score for item i for target user u (using the user set U of recommenders) is $$\hat{u} + k \cdot \sum_{s \in U} sim(u, s) \cdot (s[i] - \hat{s})$$

where sim(u, s) is the similarity between u, s, such as Jackard, Spearman's Rho or Kendall's Tau, s[i] is the ranking user s gives item i, and û is the average rating of user u. The value k is used as a normalizing factor, typically $$\frac{1}{\sum_{s \in U} sim(u, s)}.$$

The recommender set U was the 1000 most Jackard similar users, and Kendall's Tau was used for sim. Both measures were computed using the full data, or by using sketches.

Consider the scores computed for each movie in the full data set, which are referred to herein as true scores. When ordering movies according to the true scores, the first items are the best recommendations. Items in the top 5% of the list are referred to herein as relevant items. Consider scores computed using the sketches, referred to as sketch scores. Sort the list by sketch scores, and take the top items, to obtain the recommendations made using the sketches. The quality of the sketch method is determined by its precision which is the proportion of relevant items out of all the sketch recommendations.

Figure 13:
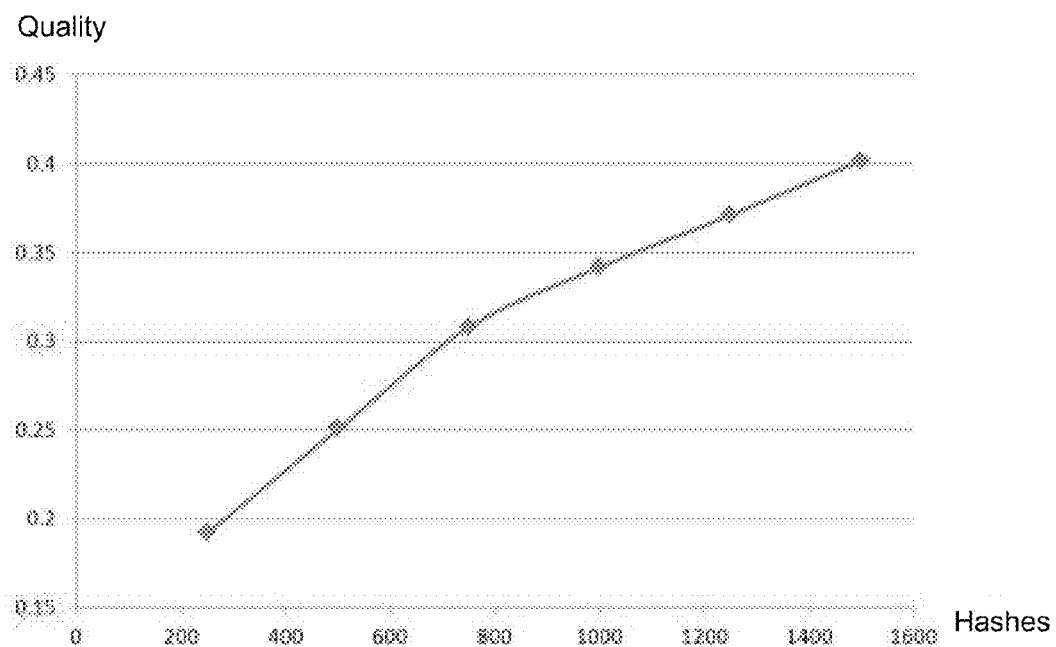
FIG. 13 is a graph of recommendation quality against the number of hashes used to create sketches.

FIG. 13 is a graph of the relation between the sketch size (number of hashes used), and the quality of the recommendations. It can be seen that the quality increases with sketch size although the quality improvement rate drops as more hashes are used. In some domains sketch based methods described herein may allow the data to fit in RAM rather than secondary storage. In this case the highest sketch size which allows the data to fit in RAM may be selected in order to maximize recommendation quality.

Figure 14:
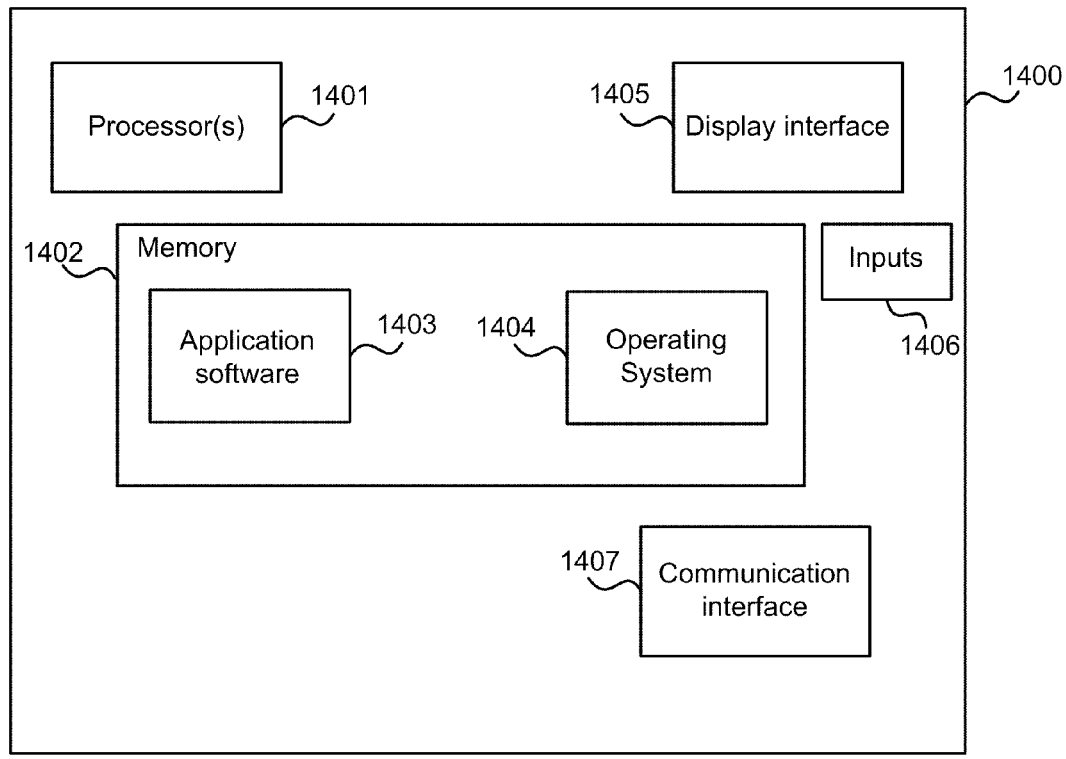
FIG. 14 illustrates an exemplary computing-based device in which embodiments of a sketch creation engine and/or collaborative filtering system may be implemented.

FIG. 14 illustrates various components of an exemplary computing-based device 1400 which may be implemented as any form of a computing and/or electronic device, and in which embodiments of a sketch generation engine and/or collaborative filtering system may be implemented.

The computing-based device 1400 comprises one or more inputs 1406 which are of any suitable type for receiving media content, Internet Protocol (IP) input, item identifiers, item rating, user identifiers, sketches or other input. The device also comprises communication interface 1407 to enable the device to communicate with other entities over a communications network.

Computing-based device 1400 also comprises one or more processors 1401 which may be microprocessors, controllers or any other suitable type of processors for processing computing executable instructions to control the operation of the device in order to generate sketches and/or provide recommendations of items. Platform software comprising an operating system 1404 or any other suitable platform software may be provided at the computing-based device to enable application software 1403 to be executed on the device.

The computer executable instructions may be provided using any computer-readable media, such as memory 1402. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 1400 it will be appreciated that the storage may be distributed or located remotely and accessed via a network or other communication link (e.g. using communication interface 1407).

An output is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
   accessing an item list that includes one or more items that have been rated by a user; and
   creating and storing a sketch of the item list, the sketch being a data structure storing a concise description of the item list, wherein creating each sketch includes:
   selecting a hash function from a plurality of hash functions of a type;
   using the hash function to generate a permutation of the item list, the permutation including a plurality of hashed values, each of the plurality of hashed values corresponding to at least one item in the item list;
   storing a minimum value of the permutation in the sketch, the minimum value being a minimum of the plurality of hashed values;
   repeatedly generating other permutations of the item list, using other hash functions selected from the plurality of hash functions of the type;

storing other minimum values of the other permutations in the sketch; and storing item ratings in the sketch such that there is one stored item rating associated with each stored minimum value, the one stored item rating being a rating, made by the user, associated with an item represented by the stored minimum value.

2. A method as claimed in claim 1 wherein the hash functions are cryptographic hash functions.

3. A method as claimed in claim 1 wherein the hash functions are randomly selected from a min-wise independent family of hashes.

4. A method as claimed in claim 1 wherein the hash functions are keyed hash message authentication code versions of a cryptographic hash function.

5. A method as claimed in claim 1 which further comprises:
receiving a target user identifier;
arranging a processor to identify pairs of users that include the target user; and
for each of the identified pairs, computing an estimate of a rank correlation by using the sketches associated with the identified pairs of users.

6. A method as claimed in claim 5 which further comprises:
providing the rank correlation estimates to a collaborative filtering system; and
arranging the collaborative filtering system to generate recommendations of items for the target user identifier on the basis of the rank correlation estimates.

7. A method as claimed in claim 5 wherein the rank correlation is a rank correlation of the form $$\alpha = a + \frac{1}{n}\sum_i f(r_a(i), r_b(i))$$

where a is a constant, $r_a(i)$ is the rating by user a of item i, $r_b(i)$ is the rating by user b of item i and n is a number of items.

8. A method as claimed in claim 5 wherein the rank correlation includes at least one of Kendall's Tau and Spearman's Rho.

9. A method as claimed in claim 1 wherein the item lists are accessed from secondary storage or as a data stream and wherein the sketches are stored in RAM.

10. A method comprising:
accessing a sketch for each user of a pair of users, each sketch being a data structure holding a description of a list of items rated by a user comprising a plurality of item identifiers and a rating for each item identifier; each sketch being smaller than its associated item list, each sketch created based on a plurality of permutations of the list of items, and each permutation generated using a hash function selected from a plurality of hash functions of a same type, a size of the sketch being determined based on an amount of memory available;
arranging a processor to identify sketch collisions between the sketches where item identifiers at corresponding positions in the sketches are the same; and
arranging the processor to examine the ratings of each item that occurs on a sketch collision and to use those ratings to compute an estimate of the rank correlation.

11. A method as claimed in claim 10 wherein the processor is further arranged to compute an estimate of Spearman's Rho by using the examined ratings to compute Spearman's Rho random variables and combining those.

12. A method as claimed in claim 10 wherein the processor is further arranged to find the proportion of sketch collisions which are agreements and use that proportion to compute an estimate of Kendall's Tau.

13. A method as claimed in claim 12 wherein the processor is further arranged to identify sketch collisions which are agreements by finding two adjacent collisions in a pair of sketches, for those collisions identifying the highest rating in each sketch, comparing the items having the identified ratings and identifying a sketch collisions agreement if the items are the same.

14. A system comprising:
a memory holding a plurality of sketches, each sketch being a data structure holding a description of a list of items rated by a user comprising a plurality of item identifiers and a rating for each item identifier; each sketch being smaller than its associated item list, each sketch created based on a plurality of permutations of the list of items, and each permutation generated using a hash function selected from a plurality of hash functions of a same type; and
a processor arranged to:
identify sketch collisions between pairs of the sketches where item identifiers at corresponding positions in the sketches are the same;
examine the ratings of items that occur on sketch collisions and to use those ratings to compute estimates of a rank correlation between pairs of users; and
predict the rating a target user would give to an unexamined item using at least some of the rank correlation estimates.

15. A system as claimed in claim 14 wherein the processor is further arranged to make the prediction using the ratings given to the unexamined item by other users, weighted according to the rank correlation estimates.

16. A system as claimed in claim 14 wherein the processor is further arranged to compute estimates of a rank correlation which is any rank correlation of the form $$\alpha = a + \frac{1}{n}\sum_i f(r_a(i), r_b(i))$$

where a is a constant, $r_a(i)$ is the rating by user a of item i, $r_b(i)$ is the rating by user b of item i and n is a number of items.

17. A system as claimed in claim 14 wherein the processor is further arranged to compute estimates of a rank correlation which is selected from any of Kendall's Tau and Spearman's Rho.

18. A system as claimed in claim 14 further comprising a sketch creation engine arranged to create each sketch by using a hash function to generate a permutation of the item list, storing a minimum value of the permutation in the sketch, repeatedly generating permutations and storing a minimum value in the sketch for more hash functions, and also storing item ratings in the sketch such that there is one stored item rating associated with each stored minimum value.

19. A system as claimed in claim 18 wherein the hash functions are keyed hash message authentication code versions of a cryptographic hash function.

20. A system as claimed in claim 14 wherein the processor is further arranged to generate recommendations of items for the target user using the predictions.

\* \* \* \* \*